United States Patent Office 2,956,958
Patented Oct. 18, 1960

2,956,958

AQUEOUS SILICA DISPERSIONS

Ralph K. Iler, Brandywine Hundred, Del., assignor to E. I. du Pont de Nemours and Company, Wilmington, Del., a corporation of Delaware No Drawing. Filed Dec. 24, 1956, Ser. No. 630,080

1 Claim. (Cl. 252—313)

This invention relates to mixtures of colloidal silica particles and more particularly to sols containing (a) one part by weight of particles having a diameter larger than 50 millimicrons (m$\mu$) and an average diameter in the range from 50 to 150 millimicrons, (b) from 0 to 0.07 part by weight of particles 0.25 D to 0.4 D m$\mu$ in diameter, where D is the average particle size of the particles in the 50 to 150 m$\mu$ size range, and (c) from 0.04 to (0.40—$x$) part by weight of particles from 4 m$\mu$ to 0.25 D m$\mu$ in diameter, where $x$ is the parts by weight of fraction (b), the particles in each case being spheroidal, amorphous silica particles, and is further directed to dry masses of said particle mixtures in the form of solid bodies and preferably films.

It is well known to make silica sols of various particle sizes and to use such sols as coating and film-forming agents. However, the films formed from sols heretofore available have been soft, non-durable, flaky and crazed, and have for these reasons been lacking in utility. No effort has been made to control particle size differentials as a means for improving the quality of films produced from silica sols.

Now according to the present invention it has been found that if the proportions of silica particles in a silica aquasol which are within certain size ranges are carefully controlled, sols are obtained which are stable and which are particularly well suited for forming films or solid bodies of silica by drying. These proportions have reference to substantially discrete, spheroidal, amorphous silica particles. The proportions require one part by weight of particles larger than 50 m$\mu$ and having an average diameter in the range from 50 to 150 m$\mu$, from 0 to 0.07 part of particles .25 D to .4 D m$\mu$ in diameter, D being the average size of particles in the 50 to 150 m$\mu$ range, and from 0.04 to (0.40—$x$) part of particles 4 to 0.25 D m$\mu$ in diameter, where $x$ is the parts by weight of fraction (b).

The sols of this invention can be concentrated by removal of water to at least 75% SiO$_2$ content without immediate gelation. Ordinarily, these sols may be somewhat viscous but still fluid and will be stable for at least an hour even at such high concentration.

At lower concentrations, such as 50 to 60% solids, the sols are stable indefinitely at ordinary room temperatures. Thus the sols are stable for at least 6 months.

The alkali content of the novel sols may vary over wide limits, and the sols may be deionized and may be alkali-free. However, for maximum stability, the more preferred sols will have an SiO$_2$:M$_2$O mol ratio from $$\frac{1.2 \times 10^4}{A} : 1 \text{ to } \frac{12 \times 10^4}{A} : 1$$

where M is a monovalent cation, such as sodium, potassium, quaternary ammonium, or the like, and A is the specific surface area of the solids in the sol expressed as square meters per gram (m.$^2$/g.). In the case of a weak base such as ammonium, somewhat more alkali is required for maximum stability.

The sols of this invention can be highly concentrated—that is, they can have an SiO$_2$ content well above 50% by weight. If maximum concentration is to be obtained, however, the sols preferably should contain some electrolyte. From 0.001 N to 0.02 N electrolyte concentration (the electrolyte being of a monovalent cation) highly concentrated, stable sols can be prepared. An optimum electrolyte content is in the range from 0.003 to 0.01 N. When the electrolyte content is above 0.02—that is, as high as 0.04, the shelf stability of the sols is somewhat less at neutral pH, and above 0.1 N the shelf stability of nearly all of the sols is affected. The particle size distribution of the silica particles can be determined from electron micrographs taken at 10,000 diameters magnification and further magnified by optical means.

The silica content, SiO$_2$:M$_2$O ratio, and electrolyte content of the sols can be determined by methods well known in the art, such as those described in United States Patent 2,750,345, issued June 12, 1956, to Guy B. Alexander.

The sols of the present invention can be prepared by mixing sols of known particle sizes prepared by methods with which the art is already familiar. Thus, sols of 5 to 8 millimicrons in diameter are described in the above-mentioned Alexander Patent 2,750,345, while the preparation of sols of particles up to 130 millimicrons in diameter is described in Bechtold and Snyder U.S. Patent 2,574,902. By processes hereinafter described sols of still larger particles can be prepared, and it will be understood that particles as large as 200 or even 250 m$\mu$ can be present in the fraction of particles of maximum size, provided the average size of particles in this fraction is below 150 m$\mu$.

The solid compositions of this invention are made by preparing a sol of mixed particles as above described, followed by removing water, by such methods as evaporation, with the sol confined in a suitable environment to give the solid product in the shape desired. Thus, the sol may be applied as a liquid coating to glass or another substrate and the water evaporated off to produce thin films. Similarly, water may be removed from the sol while the sol is confined in a mold, so that the dried product is molded to a desired shape.

The products of the invention are useful in preparing hard, coherent, water-insoluble films, and dense silica bodies. The products can include other materials such as finely ground quartz sand to produce bodies of very high density. Because of the particle size distribution shrinkage upon drying, as well as shrinkage upon sintering, is minimized.

The invention will be better understood by reference to the following illustrative examples:

In these examples, silica sols prepared by methods of the prior art and characterized by electron micrographs and surface area determinations by low temperature nitrogen adsorption were mixed together and the resulting sols evaluated in two ways.

To test film characteristics, films of 2 mg. of SiO$_2$ per cm.$^2$ were cast on clean glass plates, dried in open air at 35–40° C., baked 30 min. at 110° C. and tested for hardness by marking with a graded set of pencils. Eagle "Turquoise" drawing pencils were used after sharpening to the finest possible point with an electric pencil sharpener. Pencils were held at a 45° angle against the film using a one-pound vertical force and pushed to make a single mark across the film. The film was rated using the hardness of the hardest pencil failing to scratch the film. Thus, the best possible rating was 9H (the pencil with the hardest lead), and the poorest possible rating was 6B (the softest lead).

The closeness of packing was determined by drying the sols in shallow open dishes on a steam bath followed by further drying under vacuum at 110° C., or in a muffle furnace at 400° C. The solid masses were chipped from these dishes and their bulk densities measured, using pieces of minimum dimension not less than 1 mm., by a pycnometric method using mercury. Solids were weighed into a pycnometer of known volume which was evacuated in an upside-down position, immersed into mercury and allowed to fill by releasing the vacuum. The fraction by volume of the total space which was occupied by the silica was found by dividing the measured density by the density of amorphous silica, 2.2 g./cc.

Sols used in these examples were as follows:

100 m$\mu$ particles: This sol was prepared by a method, designated A, as follows:

(A) One gallon of a silica sol, containing 30% $SiO_2$ in the form of colloidal particles which were essentially discrete spheres having an average diameter of 15 m$\mu$ as determined from an electron micrograph, and containing 0.33% by weight $Na_2O$, was deionized as completely as possible by treatment with ion-exchange resins. Thus, the sol was deionized to pH 2.7 with "Dowex" 50 cation-exchange resin in the hydrogen form, filtered, deionized with "Amberlite" IR45 anion-exchange resin in the hydroxyl form to pH 5.6, filtered, and deionized with a mixture of the two resins to pH 3.2. The sol was diluted with two volumes of distilled water, and heated in a stainless steel autoclave at 325° C. for 6 hours. At this point the sol contained 10.6% $SiO_2$, had a pH of 8.0, and had an average particle diameter of about 100 m$\mu$. This sol was then concentrated by evaporating off water.

The sol made by process A had a $d_n$ of 102 m$\mu$, where $d_n$ is the number average particle diameter as obtained from an electron micrograph. Of the total number of particles counted 90% had diameters between 65 and 130 m$\mu$. The sol contained 33% silica and had a weight ratio of $SiO_2$:$Na_2O$ of 600. By using slightly higher temperatures of autoclaving and longer times, silica particles of 200 or even 250 millimicrons can be produced. Particles larger than about 150 millimicrons tend to settle, but such products are still useful in preparing compositions of the invention having mixed-particle sizes.

41 m$\mu$ particles: The sol having $d_n$=41 m$\mu$ was prepared by the method of Example 3 of Bechtold and Snyder U.S. Patent 2,574,902. It contained 30% silica and had a weight ratio of $SiO_2$:$Na_2O$ of 90.

38, 35 and 29 m$\mu$ particles: Sols having the listed diameters were prepared by the same technique and had the same composition as the 41 m$\mu$ particles.

22 m$\mu$ particles: This sol was prepared by method A above described. As determined from an electron micrograph 90% of its particles were within the range of 10 to 32 m$\mu$. This sol contained 24.8% silica and had a ratio of 90.

16 m$\mu$ particles: This sol was prepared in the same manner as the 41 m$\mu$ sol, contained 30% silica and had a ratio of 270.

10 m$\mu$ particles: This sol was prepared by a method described in U.S. Patent 2,750,345, and contained particles of 300 m.$^2$/g. specific surface area. It contained 18.0% silica at a ratio of 90.

7 m$\mu$ particles: This sol was prepared by a method described in U.S. Patent 2,750,345, and contained particles of 440 m.$^2$/g. specific surface area at a concentration of 14.6% $SiO_2$ and $SiO_2$:$Na_2O$ ratio of 52.

Example 1

The sol of this example was prepared by mixing together the following sols:

| Particle Diameter | Wt. of Sol, g. | Relative Wt. of Silica, g. |
|---|---|---|
| 100 | 112 | 74 |
| 40 | 8 | 5.1 |
| 22 | 3.5 | 1.7 |
| 16 | 7.8 | 4.7 |
| 10 | 2.5 | 0.9 |
| 7 | 3.8 | 1.1 |

Thus the sol contains one part of 100 m$\mu$ particles, 0.069 part of particles in the range of 25 to 40 m$\mu$, and 0.12 part of particles in the range 4 to 25 m$\mu$.

Part of this sol was dried down and heated at 100° C. giving a bulk density of 1.658 g./cc. or a volume packing of 75.4%.

Another part of the sol was dried and heated at 400° C., giving a bulk density of 1.672 g./cc. or a volume packing of 76.0%, showing the effect of drying temperature to be very slight.

A film was cast from this sol which had a hardness of H to 2H.

In contrast, the sol containing only the 100 m$\mu$ particles was dried at 110° C. This gave a product having a bulk density of 1.548 g./cc. corresponding to a volume packing of 70.5%. When the sol was dried at 400° C. it gave a bulk density of 1.553 g./cc. corresponding to a volume packing of 70.6%.

A film cast from this sol had a hardness of 2B.

In further contrast, a sol was prepared by mixing 10 g. of the 100 m$\mu$ sol with 0.715 g. of the 38 m$\mu$ sol. The bulk density of the product dried at 110° C. was 1.543 g./cc., giving a volume packing of 70.2%. The hardness of a film cast from this sol was 1B.

Example 2

This sol contained the following mixture:

| Particle Diameter | Wt. of Sol, g. | Relative Wt. of $SiO_2$, g. |
|---|---|---|
| 100 | 10 | 74 |
| 16 | 1.76 | 11.9 |
| 10 | 0.56 | 2.3 |
| 7 | 0.85 | 2.8 |

This sol contains one part 100 m$\mu$ particles and 0.23 part of particles in the range 4 to 25 m$\mu$.

Dried at 110° C. the solid had a bulk density of 1.748 g./cc. corresponding to a volume packing of 79.5%. A film cast from this sol had a hardness of 8H.

A portion of this sol was passed through a column of "Dowex" 50 cation-exchange resin in the hydrogen form reducing the sol pH from 9.4 to 2.8. The volume packing increased to 82.1% (bulk density=1.806 g./cc.) and the film hardness remained unchanged.

Example 3

The following mixture was prepared:

| Particle Diameter | Wt. of Sol, g. | Relative Wt. of $SiO_2$, g. |
|---|---|---|
| 100 | 10 | 74 |
| 22 | 2.15 | 11.9 |
| 10 | 0.56 | 2.3 |
| 7 | 0.85 | 2.8 |

Dried at 110° C., the bulk density was 1.770 and volume packing was 80.4%. The film hardnes was 9H, meaning that this film was not scratched by the hardest pencil.

Example 4

Ten grams of the 100 m$\mu$ sol was mixed with 6.24 g. of the 7 m$\mu$ sol. The relative weights of silica were 1:0.27 respectively. Dried at 110° C., the bulk density was 1.765, giving a volume packing of 80.2.

Example 5

The following mixture was prepared:

| Particle Diameter | Wt. of Sol, g. | Relative Wt. of SiO$_2$, g. |
|---|---|---|
| 100 | 10.0 | 74 |
| 38 | 0.72 | 5.1 |
| 7 | 2.43 | 7.9 |

Dried at 110° C., the bulk density was 1.755 g./cc., giving a volume packing of 79.8%. A film cast from this sol had a hardness of H–2H.

Example 6

A sample of quartz sand consisting of spheroidal grains 0.3–0.5 mm. in diameter was packed into a conical mold. A concentrated silica sol was prepared by mixing 111 g. of the 100 m$\mu$ sol with 20 g. of the 16 m$\mu$ sol and 21 g. of the 7 m$\mu$ sol and evaporating under reduced pressure at 35–40° C. until the silica concentration was increased to 69%. The silica sol was then introduced into the evacuated packed sand from the bottom until all the interstices were filled. The impregnated mass was then dried at 100° C. and finally baked at 400° C. to insure complete removal of the water. The hard dense mass having exactly the shape of the mold was removed and found to have a bulk density of 2.267 g./cc. corresponding to a volume packing of 91%.

I claim:

A composition of matter in the form of an aqueous silica dispersion in which the only silica particles of colloidal size are present as a mixture of spheroidal, amorphous, silica particles in the proportion, by weight, of (a) one part of particles having a diameter larger than 50 millimicrons and an average diameter, D, in the range from 50 to 150 millimicrons, (b) from 0 to 0.07 part of particles from 0.25 D to 0.4 D millimicrons in diameter, and (c) from 0.04 to (0.40−x) part of particles 4 to 0.25 D millimicrons in diameter where x is the parts by weight of fraction (b).

References Cited in the file of this patent

UNITED STATES PATENTS

| | | |
|---|---|---|
| 2,577,485 | Rule | Dec. 4, 1951 |
| 2,661,438 | Shand | Dec. 1, 1953 |
| 2,731,326 | Alexander et al. | Jan. 17, 1956 |
| 2,741,600 | Allen | Apr. 10, 1956 |